United States Patent
Xia

(10) Patent No.: US 8,484,364 B2
(45) Date of Patent: *Jul. 9, 2013

(54) SECURE DELIVERY OF FLASH CONTENT OVER NETWORKS

(75) Inventor: Zeqing Xia, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,618

(22) Filed: Apr. 30, 2012

(65) Prior Publication Data

US 2012/0215887 A1    Aug. 23, 2012

Related U.S. Application Data

(63) Continuation of application No. 11/383,843, filed on May 17, 2006, now Pat. No. 8,190,752.

(51) Int. Cl.
*G06F 15/16* (2006.01)
(52) U.S. Cl.
USPC .......................................................... 709/229
(58) Field of Classification Search
USPC ............................. 717/174–178; 709/226–229
See application file for complete search history.

(56) References Cited

U.S. PATENT DOCUMENTS

| | | | |
|---|---|---|---|
| 5,689,709 A | 11/1997 | Corbett et al. | |
| 6,334,213 B1 | 12/2001 | Li | |
| 6,918,113 B2 * | 7/2005 | Patel et al. | 717/178 |
| 7,072,933 B1 | 7/2006 | Lamb et al. | |
| 7,293,260 B1 | 11/2007 | Dmitriev | |
| 7,509,490 B1 | 3/2009 | Hsu et al. | |
| 2004/0230820 A1 | 11/2004 | Hui Hsu et al. | |
| 2005/0039165 A1 | 2/2005 | Wolff et al. | |
| 2006/0230070 A1 | 10/2006 | Colton et al. | |
| 2007/0097959 A1 | 5/2007 | Taylor | |
| 2007/0239528 A1 | 10/2007 | Xie et al. | |
| 2007/0250618 A1 | 10/2007 | Hammond | |
| 2008/0022267 A1 | 1/2008 | Johnson et al. | |
| 2008/0215968 A1 | 9/2008 | Bekerman | |

OTHER PUBLICATIONS

Co-pending U.S. Appl. No. 11/383,843, filed May 17, 2006, entitled "Secure Delivery of Flash Content Over Networks" by Xia (50 pages).

* cited by examiner

*Primary Examiner* — Chirag R Patel
(74) *Attorney, Agent, or Firm* — Harrity & Harrity, LLP

(57) ABSTRACT

A method for securing delivery of flash content over a network includes rewriting flash content action code capable of making a network request for flash content to redirect network communication associated with the flash content to a network device.

20 Claims, 15 Drawing Sheets

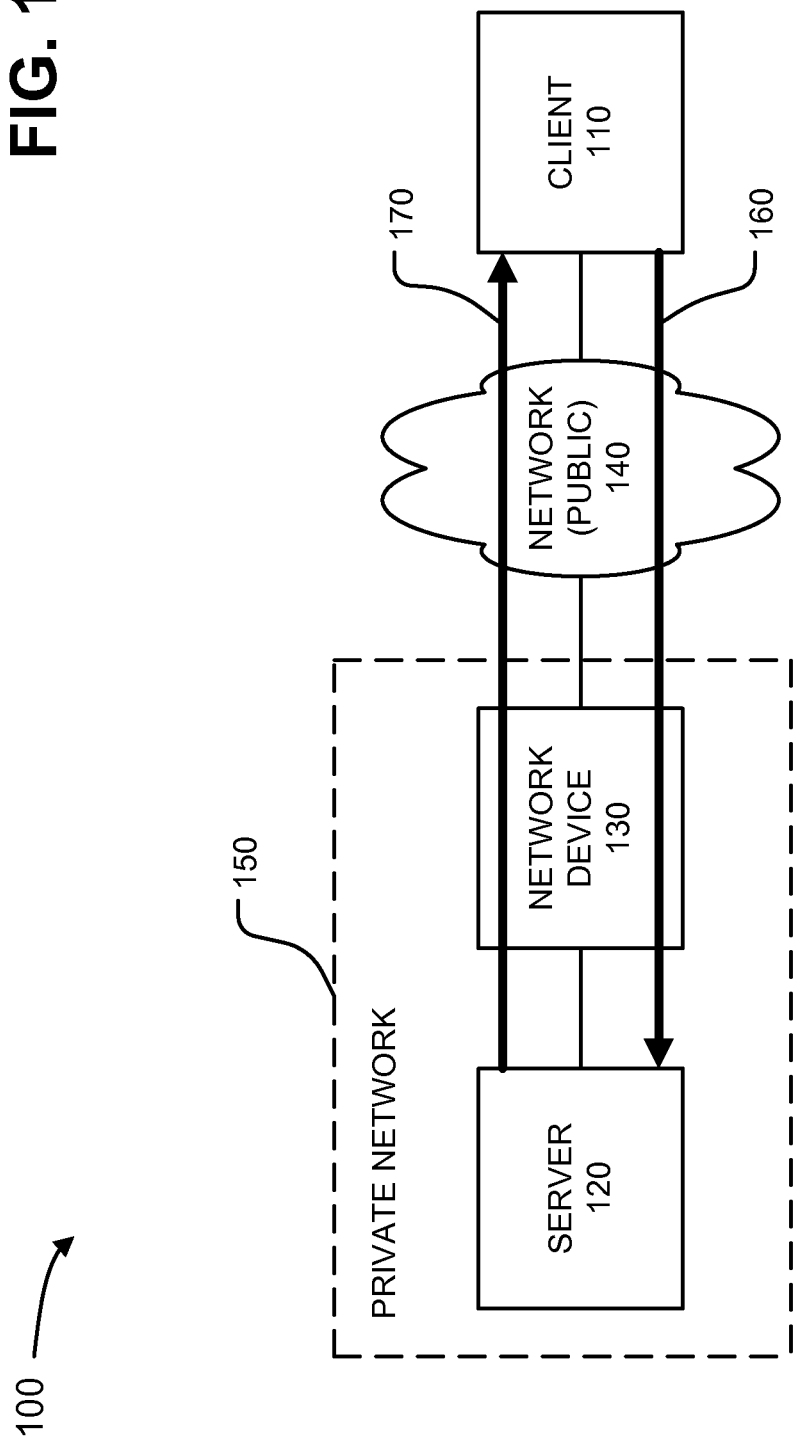

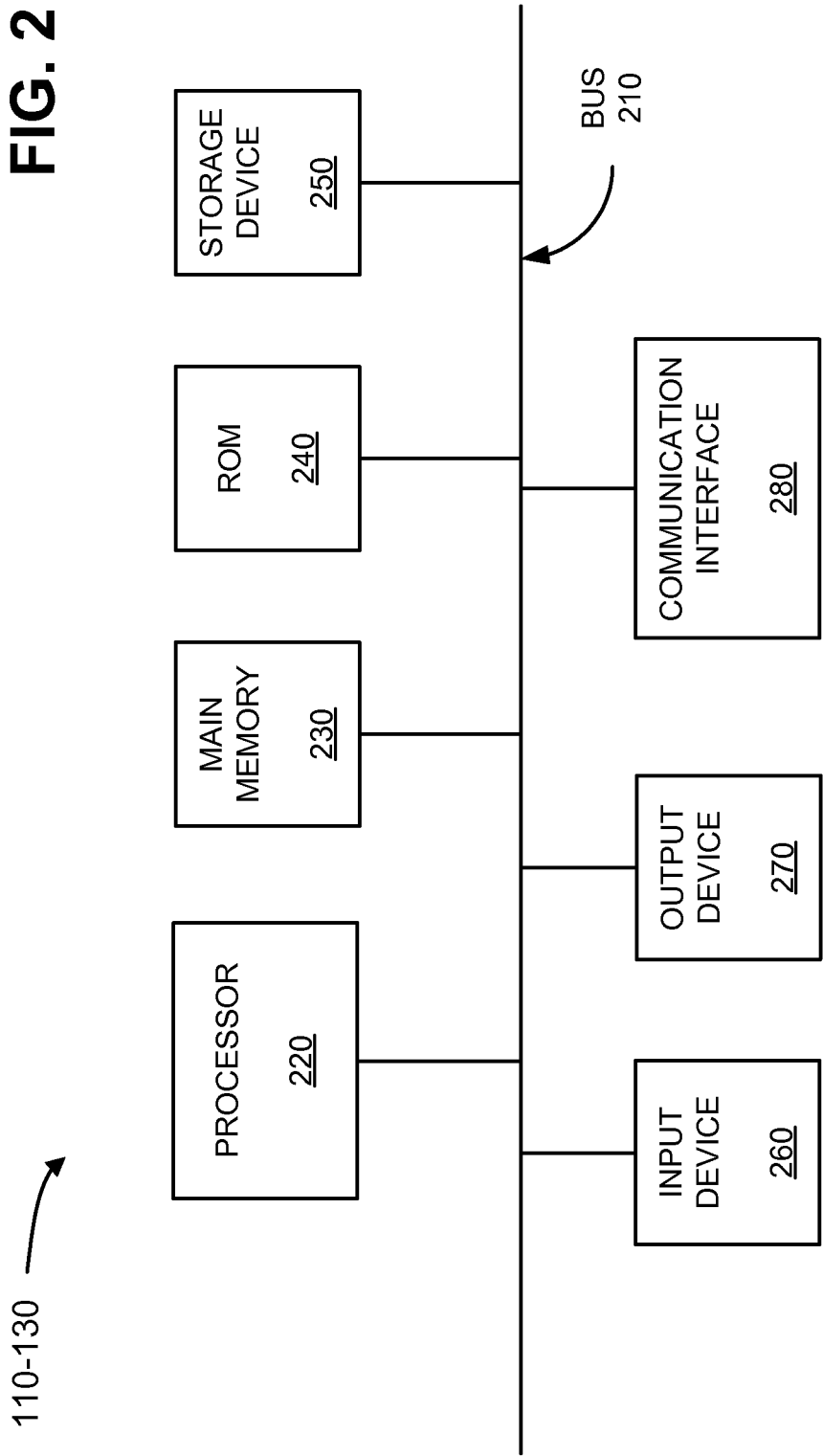

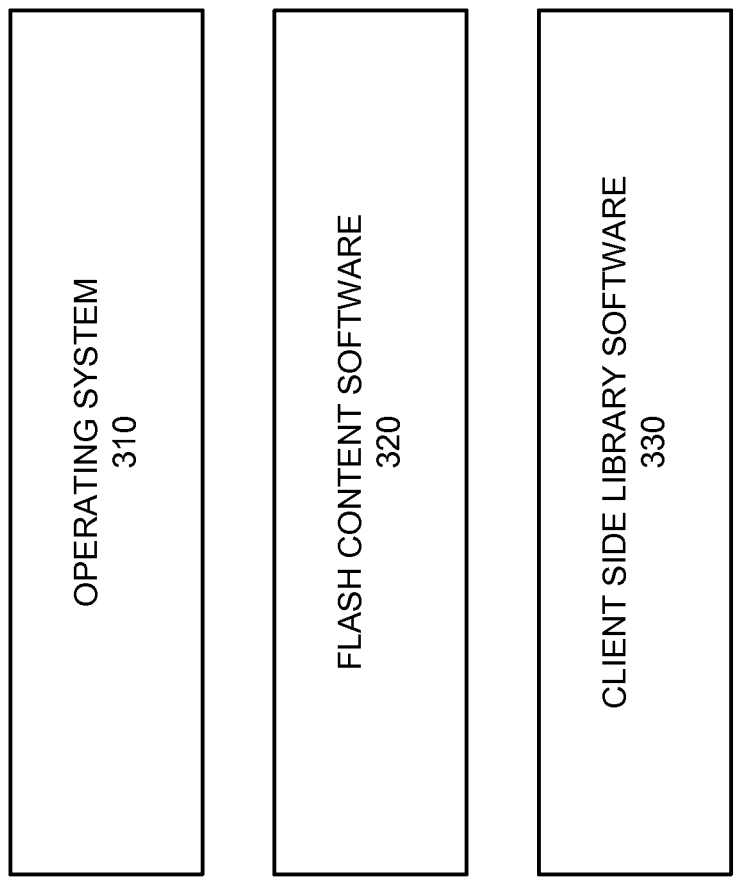

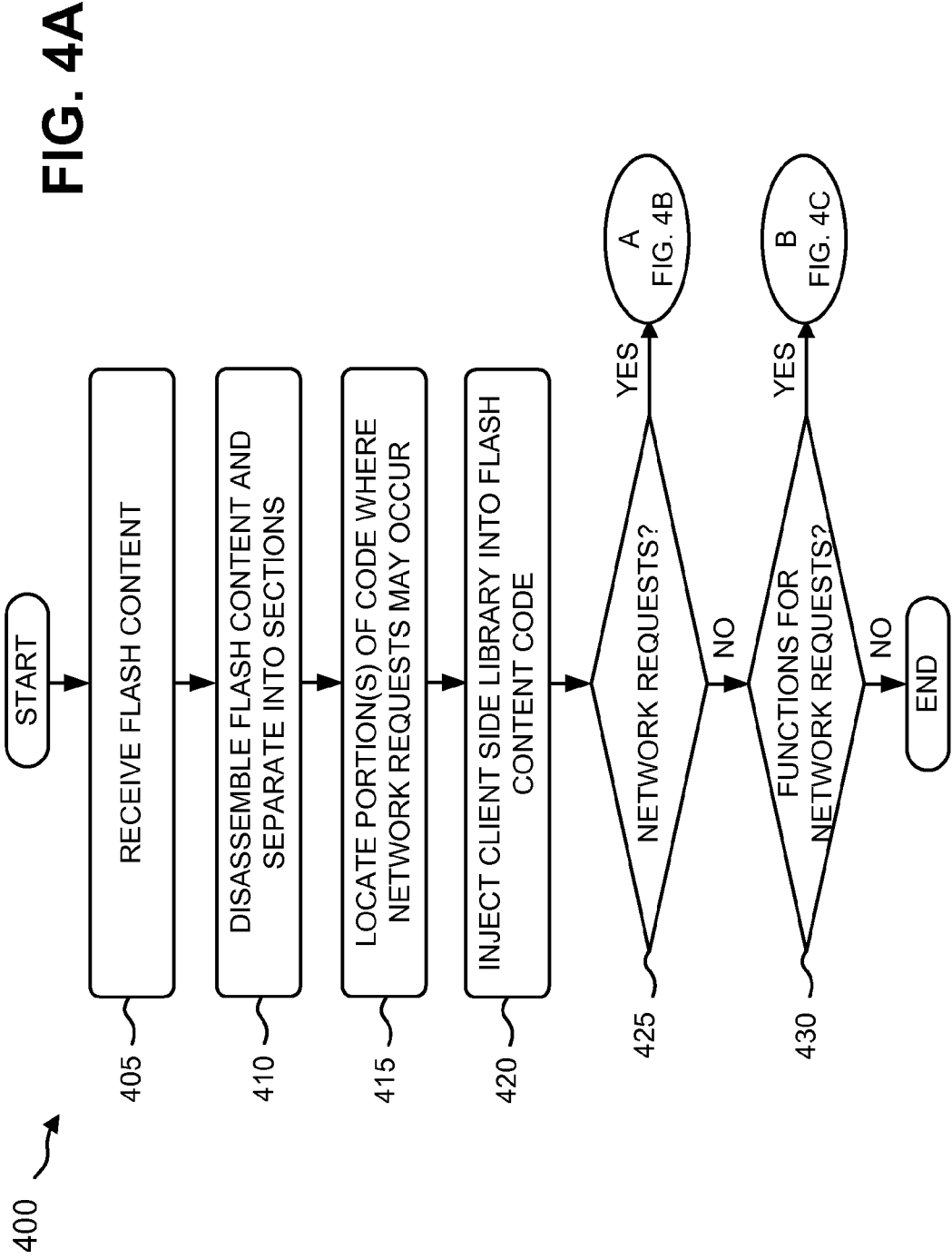

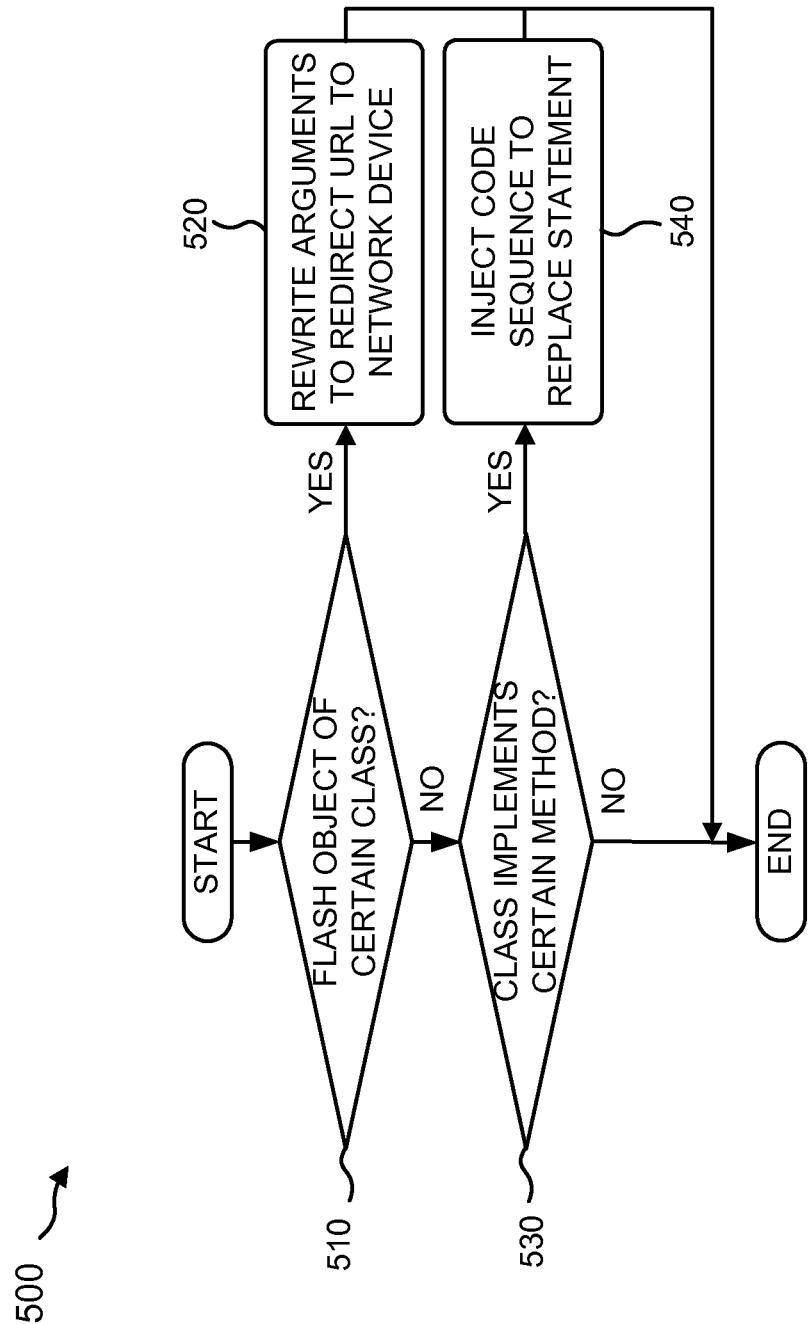

FIG. 6A

610 — var movieName = "http://abc.com/myMovie.swf";
loadMovieNum(movieName, 1);

FIG. 6B

620 — var movieName = "http://abc.com/myMovie.swf";
RewriteAndLoad(movieName, "loadMovieNum", 1); ← 630

FIG. 6C

640 — https://myGateway.com/,RedirectTo=abc.com,Type=swf+/myMovie.swf

FIG. 6D

650 — 
frame 0
   constants 'movieName', 'myMovie.swf', '_level1'
   push 'movieName', 'myMovie.swf'
   varEquals
   push 'movieName'
   getVariable
   push '_level1'
   getURL2
end // of frame 0

FIG. 6E

```
frame 0
    constants 'movieName', 'myMovie.swf', '_level1'
    push 'movieName', 'myMovie.swf'
    varEquals
    push 'movieName'
    getVariable
    push '_level1'
    push <flags>, 3, "RewriteAndLoad"  ⎫
    callFunction                        ⎬ 670
    pop                                 ⎭
end // of frame 0
```
660

FIG. 9

```
function RewriteAndLoad(flags, target, url)
{
    var newURL = RewriteURL(url);
    if (flags == 192) loadVariables(newURL, target);
    else if (flags == 193) loadVariables(request, target, "GET");
    ...
}
```

1010 — 
```
var varLoader = new LoadVars();
varLoader.load("http://flash-mx.com/mm/params.txt");
```

FIG. 10B

1020 — 
```
frame 0
    constants 'varLoader', 'LoadVars',
             'http://www.flash-mx.com/mm/params.txt', 'load'
    push c:0, 0.0, c:1
    new
    varEquals
    push c:2, 1, c:0
    getVariable
    push c:3
    callMethod
    pop
end // of frame 0
```

FIG. 10C

1030 — 
```
constants 'varLoader', 'LoadVars',
         'http://www.flash-mx.com/mm/params.txt', 'load'
push c:0, 0.0, c:1
new
varEquals
push c:2, 1, c:0
getVariable
push c:3
push 4, 'RewriteMethodInvocation1'
callFunction
pop
```

FIG. 11

```
function RewriteMethodInvocation1(methodName, aObj, numArgs, arg)
{
    if (methodName == "load") {
        if (DSIsClass(aObj, XML) || DSIsClass(aObj, LoadVars)) {
            arg = DSRewrite(arg, methodName, 0);
            aObj.load(arg);
            return;
        }
    } else if (methodName == "loadMovie") {
        if (DSIsClass(aObj, MovieClip)) {
            arg = DSRewrite(arg, methodName, 0);
            aObj.loadMovie(arg);
            return;
        }
    } else if (methodName == "loadVariables") {
        if (DSIsClass(aObj, MovieClip)) {
            arg = DSRewrite(arg, methodName, 0);
            aObj.loadVariables(arg);
            return;
        }
    } else if (methodName == "connect") {
        if (DSIsClass(aObj, NetConnection)) {
            arg = DSRewrite(arg, methodName, 0);
            aObj.connect(arg);
            return;
        }
    }
    //loadVariables(methodName + "." + arg + ".end_of_func1", _root);
    trace("DSReplaceMe"); // do not delete this line!
}
```

1110

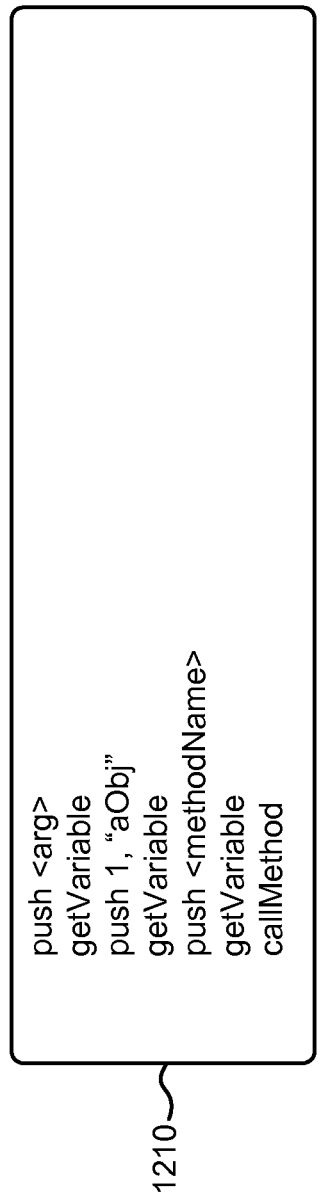

SECURE DELIVERY OF FLASH CONTENT OVER NETWORKS

RELATED APPLICATIONS

This application is a continuation of U.S. patent application Ser. No. 11/383,843, filed May 17, 2006. The entire disclosure of this application is incorporated herein by reference.

BACKGROUND

1. Field of the Invention

Implementations consistent with principles of the invention relate generally to communication systems and, more particularly, to secure delivery of flash content over networks.

2. Description of Related Art

The term "flash," as used herein, may refer to a Macromedia flash player, a multimedia authoring program used to create content for the flash player, and/or media assets (e.g., images, games, graphics, video, etc.) created using the multimedia authoring program. Flash as a format has become very widespread on the desktop market, and may be one of the most popular plug-ins for web browsers. Vector graphics (e.g., PostScript, SVG, PDF, etc.) may permit flash files to translate to small file sizes which may take less bandwidth to transmit than bitmaps and/or video clips.

Flash players may exist for a wide variety of different systems and devices. For example, flash content may run on Microsoft Windows, MacOs, Linux, and various other Unix systems. Flash players may operate within, for example, the GNU/Linux x86, Mac OS 9/X, Solaris, HP-UX, Pocket PC, OS/2, Symbian, Palm OS, BeOs, and IRIX operating systems, as well as other operating systems.

A flash program (e.g., a file having a ".swf" file extension) may include content (e.g., media assets), and sequences of executable code to manipulate the content and handle user interactivity. In a typical web environment, a flash program may be delivered by a web server to a client browser, which may invoke a flash player to execute the flash program. The executable code, which may be referred to as "action code," may be based on a set of binary instructions defined on a virtual machine built into the flash player. A binary action code sequence may result from compiling the flash multimedia authoring programming language, which may be referred to as "ActionScript." However, it may be possible to generate the binary action code sequence by other mechanisms. The virtual machine may provide facilities for invoking network communications via action code sequences.

Flash authors may not wish to expose their images and/or action code to the world. However, once a flash program is saved locally, it may be decompiled into its source code and media assets. Some decompilers may be capable of nearly full reconstruction of the original source file, down to the action code that was used during creation.

Organizations may utilize flash programs for a variety of purposes. For example, more and more organizations are adopting flash content in developing corporate web media assets and applications. However, these same organizations are continuously looking to prevent information leakage from their internal networks and endpoints (e.g., devices connected to the networks). In today's world of mobile employees and extranet partners, both of which may need to connect to an internal network, this is becoming increasingly important. For example, information leakage may occur with confidential flash content sent to a mobile employee, because the employee may receive unprotected flash content via an external or public network (e.g., the Internet).

An existing solution to this problem for flash content may be to provide client-side traffic tunneling software. Unfortunately, traffic tunneling may require that a piece of software (e.g., ActiveX component, Java applet, etc.) be downloaded and executed on a client device (e.g., a laptop of a mobile employee). Thus, traffic tunneling is not a "clientless" solution, and may require providing administrative privileges on the client device. This may expose the organization's internal network (e.g., the internal network server containing the flash content) to information leakage because the client device may directly connect to the internal network server, and the confidential flash content may not be securely accessible from outside the organization.

SUMMARY

According to one aspect, a computer-readable medium may store computer-executable code for securing delivery of flash content over a network. The code may include instructions to disassemble and separate the flash content into sections, wherein at least one of the sections includes action code, instructions to locate a portion of the action code capable of making a network request for the flash content, and instructions to rewrite the portion of the action code capable of making the network request to redirect network communication associated with the flash content to a secure network device.

According to another aspect, a device for securing delivery of flash content over a network may include a memory, and a processor, connected to the memory. The processor may locate a portion of action code of the flash content capable of making a network request for the flash content, and rewrite the portion of the action code capable of making the network request to redirect network communication of the flash content to the device.

According to yet another aspect, a method for securing delivery of flash content over a network may include rewriting flash content action code capable of making a network request for flash content to redirect network communication associated with the flash content to a network device.

According to yet another aspect, a system for securing delivery of flash content over a network may include means for disassembling and separating the flash content into at least action code, means for locating a portion of the action code capable of making a network request for the flash content, and means for rewriting the portion of the action code capable of making the network request to redirect network communication associated with the flash content to a secure network device.

According to still a further aspect, a system may include a server to store flash content, and a network device. The network device may receive the flash content from the server and disassemble the flash content into at least action code, locate a portion of the action code capable of making a network request for the flash content, and rewrite the portion of the action code capable of making the network request to redirect network communication associated with the flash content to the network device.

According to still another aspect, a computer-readable medium may store computer-executable code for securing delivery of flash content over a network. The code may include instructions to determine if an object of flash content action code may be of a certain class, and instructions to rewrite arguments of the flash content action code to redirect network communication associated with the object to a network device if the object is of the certain class. The code may further include instructions to determine if an application class of the flash content action code implements a non-network related method, and instructions to inject a code sequence that replaces a statement in the flash content action code if the application class implements the non-network related method.

BRIEF DESCRIPTION OF THE DRAWINGS

The accompanying drawings, which are incorporated in and constitute a part of this specification, illustrate an embodiment of the invention and, together with the description, explain the invention. In the drawings:

FIG. 1 is an exemplary diagram of a network in which systems and methods consistent with principles of the invention may be implemented;

FIG. 2 is an exemplary block diagram of a device that may correspond to a client, network device, and/or server of FIG. 1;

FIG. 3 is a diagram of a portion of an exemplary computer-readable medium that may be used by the device of FIG. 2;

FIGS. 4A-4C provide a flowchart of an exemplary process for redirecting flash content to a secure intermediate network device according to an implementation consistent with principles of the invention;

FIG. 5 is a flowchart of an exemplary process for redirecting flash objects to a secure intermediate network device according to an implementation consistent with principles of the invention;

FIGS. 6A-6E are diagrams of exemplary portions of software instructions for redirecting flash content to a secure intermediate network device according to implementations consistent with principles of the invention;

FIG. 9 is a diagram of an exemplary portion of software instructions for redirecting flash content to a secure intermediate network device according to an implementation consistent with principles of the invention;

FIGS. 10A-10C are diagrams of exemplary portions of software instructions for redirecting flash content to a secure intermediate network device according to implementations consistent with principles of the invention;

FIG. 11 is a diagram of an exemplary portion of software instructions for redirecting flash objects to a secure intermediate network device according to an implementation consistent with principles of the invention; and FIG. 12 is a diagram of an exemplary portion of software instructions for redirecting flash content to a secure intermediate network device according to implementations consistent with principles of the invention.

DETAILED DESCRIPTION

Figure 4B:
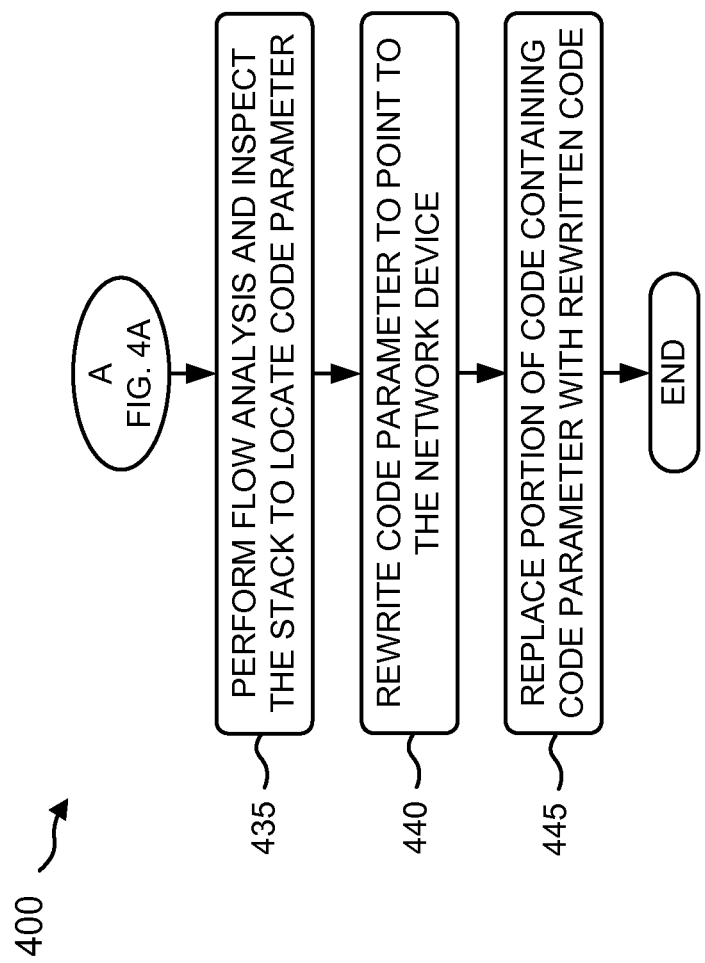

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described more fully below, implementations consistent with principles of the invention relate to intermediation of flash content for secure deliver over a network. By securing the flash content as it is being delivered to a client (e.g., a client running a web browser), certain flash actions that are transmitted via a network by a network server may be modified so that, when loaded into the client, the flash content may communicate with an intermediate network device rather than the network server. This may ensure that communications between the client running the flash content and the network may be captive and secure. The communications between the client running the flash content and the network may be controlled by the intermediate network device, and may be performed in a "clientless" manner, i.e., without client-side traffic tunneling software.

Instead of traffic tunneling by another piece of software, implementations consistent with principles of the invention may directly modify binary instructions of the flash content action code, as it is being delivered to the client, so that binary instructions related to network communications may be rewritten to redirect flash content to the secure intermediate network device. Because flash content may be in a binary format, one implementation consistent with principles of the invention may analyze the binary format (which may include assembly-like instructions, call sequences, stacks, etc.), may inject new instructions and parameters at certain locations of the binary format, and may adjust the overall instruction sequences of the binary format.

Exemplary Network

FIG. 1 is an exemplary diagram of a network 100 in which systems and methods consistent with principles of the invention may be implemented. Network 100 may include a client 110, a server 120, a network device 130, and a public network 140. A single client 110, server 120, and network device 130 have been illustrated in FIG. 1 for simplicity. In practice, there may be more clients 110, servers 120, and/or network devices 130. Also, in some instances, client 110 may perform a function of server 120 and/or server 120 may perform a function of client 110.

As shown in FIG. 1, client 110 may connect to a private network 150, which may contain server 120 and network device 130, via public network 140. Private network 150 may include a local area network (LAN), a private network, such as a company intranet, or another type of network. Private network 150 may also include organizational components, devices, servers, etc. (not shown in FIG. 1). Public network 140 may include a local area network (LAN), a wide area network (WAN), a telephone network, such as the Public Switched Telephone Network (PSTN), the Internet, other networks, or a combination of networks.

Client 110 and/or server 120 may each include a device, such as a personal computer, a wireless telephone, a personal digital assistant (PDA), a lap top, or another type of computation or communication device, or a process running on one of these devices. In one implementation, client 110 and/or server 120 may take the form of a provider of network content, such as flash content, a file, a web page, an email, an instant message, etc.

Server 120 may include a server, or a set of servers, that contain information, e.g., flash content. "Flash content," as the term is used herein, is to be broadly interpreted to include, for example, the multimedia authoring program (e.g., flash content ActionScript program) used to create content for the flash player, the media assets (e.g., images, games, graphics, video, etc.) created using the multimedia authoring program, and/or the executable code (e.g., flash content action code) used to manipulate the content and handle user interactivity.

Network device 130 may include a data transfer device, such as a gateway, a router, a switch, a firewall, a bridge, a proxy server, a device providing an instant virtual extranet (IVE), a device providing a secure sockets layer (SSL) virtual private network (VPN), or some other type of device that processes and/or transfers data. SSL may provide endpoint authentication and communications privacy over a public network using cryptography. In one implementation, network device 130 may operate on data on behalf of an organizational network, such as private network 150. For example, network device 130 may receive all, or substantially all, data destined for private network 150 and/or transmitted by private network 150.

In one implementation consistent with principles of the invention, network device 130 may utilize a secure VPN (e.g., SSL VPN) to provide a document(s) (e.g., flash content) to a client (e.g., client 110) requesting such a document(s). The secure VPN may use cryptographic protocols to provide necessary confidentiality (e.g., preventing hackers), client authentication (e.g., preventing identity spoofing), and message integrity (preventing message alteration) to achieve the privacy intended for the document(s) by private network 150. The secure VPN may provide secure communications for the flash content over unsecured networks (e.g., public network 140).

A "document," as the term is used herein, is to be broadly interpreted to include any machine-readable and machine-storable work product. A document may include, for example, an application, a program, flash content, an email, a portion of an email, a series of emails, an instant message, a portion of an instant message, a series of instant messages, a file, a portion of a file, a combination of files, one or more files with embedded links to other files, a web site, combinations of any of the aforementioned, etc. Documents often include textual information and may include embedded information (such as meta information, images, hyperlinks, etc.) and/or embedded instructions (such as Javascript, etc.).

A "link," as the term is used herein, is to be broadly interpreted to include any reference to/from a document from/to another document or another part of the same document.

Network device 130 may cause one or more operations to be performed on a document (e.g., flash content) when the document is requested by client 110. For example, in one implementation, network device 130 may analyze the flash content requested by client 110, and locate portions of the flash content related to network communications. Network device 130 may modify the portions of the flash content related to network communications so that client 110 may receive the flash content via an intermediate network device (e.g., network device 130), rather than receiving the flash content directly from a network server (e.g., server 120). Network device 130, in turn, may provide secure communications of the flash content to client 110 over unsecured networks (e.g., public network 140).

In another implementation, network device 130 may also provide a client side library within the flash content. A "library," as the term is used herein, is to be broadly interpreted to include, for example, an object; a process; a collection of subprograms used to develop software; "helper" code and data, which may provide services to independent programs and may allow code and data to be shared and changed in a modular fashion; etc. The client side library may review the flash content as it is running on client 110. For example, certain objects and/or certain methods of the flash content may not be activated until the flash content is running on client 110. Such objects and methods may also be redirected to the intermediate network device (e.g., network device 130) by the client side library, to ensure secure communication of the objects and methods.

As further shown in FIG. 1, client 110 may send a request 160 for flash content to private network 150. Request 160 may be received by network device 130, and forwarded to server 120. However, instead forwarding the flash content directly from server 120 to client 110, a response 170 providing the flash content may be redirected to network device 130. Network device 130 may provide secure communication of response 170 to client 110.

Exemplary Device Architecture

FIG. 2 is an exemplary block diagram of a device, which may correspond to client 110, server 120, and/or network device 130. The device may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

The device, consistent with principles of the invention, may perform certain operations, as described in detail below. The device may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Computer-Readable Medium

FIG. 3 is a diagram of a portion of an exemplary computer-readable medium 300 that may be used by a device, such as the device of FIG. 2. In one implementation, computer-readable medium 300 may correspond to memory 230 of server 120. In another implementation, computer readable medium 300 may correspond to memory of network device 130. The portion of computer-readable medium 300 illustrated in FIG. 3 may include an operating system 310, flash content software 320, and/or client side library software 330. Software 320/330 may be included in operating system 310 or may be separate from operating system 310.

Operating system 310 may include operating system software, such as the Microsoft Windows, Apple MAC OS, Linux, Unix, or IBM OS/2 operating systems, or other similar operating systems.

Flash content software 320 may include any executable object or process for analyzing and/or modifying portions of the flash content (e.g., action code) that may relate to network communications. The executable object or process may enable a client (e.g., client 110) to securely receive flash content via an intermediate network device (e.g., network device 130), rather than receiving flash content directly from a network server (e.g., server 120).

Flash content software 320 may be automatically activated when a client (e.g., client 110) attempts to retrieve flash content from a network (e.g., private network 150), or when client 110 attempts to transmit flash content to a network, such as private network 150. In each case, flash content software 320 may identify and modify portions of the flash content (e.g., action code) that may relate to network communications, as will be described below.

Client side library software 330 may include an executable object or process. Client 110 may obtain the executable object or process from a device (e.g., network device 130) and/or a server (e.g., server 120), via injection of the executable object or process into the flash content (e.g., action code). Client side library software 330 may analyze the flash content action code, while the flash content is running on a client (e.g., client 110), to determine if an object class in the action code is of a certain class that may include a network application programming interface (API) of the same name. An API may include the interface that a computer system, library or application provides in order to permit requests for service to be made by other computer programs, and/or to allow data to be exchanged. If the object is of the certain class, then client side library software 330 may rewrite the flash content to redirect the object to the intermediate network device (e.g., network device 130).

Client side library software 330 may additionally and/or alternatively determine, while flash content is running on a client, if a class in the content implements a certain method or function not invoking network requests (e.g., from private network 150). If the class implements the certain method or function, then client side library software 330 may not modify the flash content, but may inject a code sequence that may replace a portion of the flash content action code.

Client side library software 330 may be automatically activated upon initiation of the flash content on a client (e.g., client 110). Client side library software 330 may be provided in the flash content action code, prior to initiation, by a network device (e.g., network device 130). Client side library software 330 may also be automatically activated when client 110 attempts to connect to network device 130. In each case, client side library software 330 may analyze and/or modify the flash content action code, while the flash content is running on a client (e.g., client 110), as will be described below.

Exemplary Processing

In flash content action code, there may be two usage patterns for network communications, both of which may relate to hypertext transfer protocol (HTTP) requests. The first usage pattern may use a set of instructions in the flash content action code (e.g., a "getURL" action code instruction, which may also be known as "hex code 0x83") for network communications. The virtual machine of the flash player may interpret such action code instructions by popping a string uniform resource locator (URL) value from a stack, and by sending an network request with the URL value to a flash content source (e.g., server 120).

The second usage pattern may dynamically invoke flash content (e.g., ActionScript) functions provided in a string on a stack via an action code instruction (e.g., "callMethod," which may also be known as "hex code 0x52"). For example, object method invocations may be compiled into an action code sequence that performs the "callMethod." The dynamic action code instruction may occur upon activation of the flash content in a client (e.g., client 110).

Further network requests may occur when flash content is running on the client. For example, the flash content may make a network request for an object (e.g., a video file) while it is running on the client. Network requests for objects may not occur until the flash content is running on the client because, for example, certain objects may not be invoked until a client user requests the objects.

Implementations consistent with principles of the invention address network invocations by the flash content action code, i.e., the two usage patterns for network communications, and the network requests generated when flash content is running on the client. For example, in one implementation, the flash content action code may be inspected for the two usage patterns related to network communications, the relevant instructions may be identified, and the relevant portions of the flash content action code may be rewritten to redirect the flash content to an intermediate network device (e.g., network device 130). In another implementation, the flash content action code may be analyzed, while the content is running on a client (e.g., client 110), to determine if an object class in the content is of a certain class that may include a network API of the same name. If the object is of the certain class, then the flash content action code may be rewritten to redirect the object to the intermediate network device (e.g., network device 130). In still another implementation, while flash content is running on a client, if a class in the flash content action code implements a certain method or function, then a code sequence may be injected into the flash content action code that may replace a portion of the flash content action code.

Modification of flash content network invocations to redirect communications to a secure intermediate network device is described more fully below.

Rewriting Network Communications Usage Patterns in Flash Content Action Code

Figure 4C:
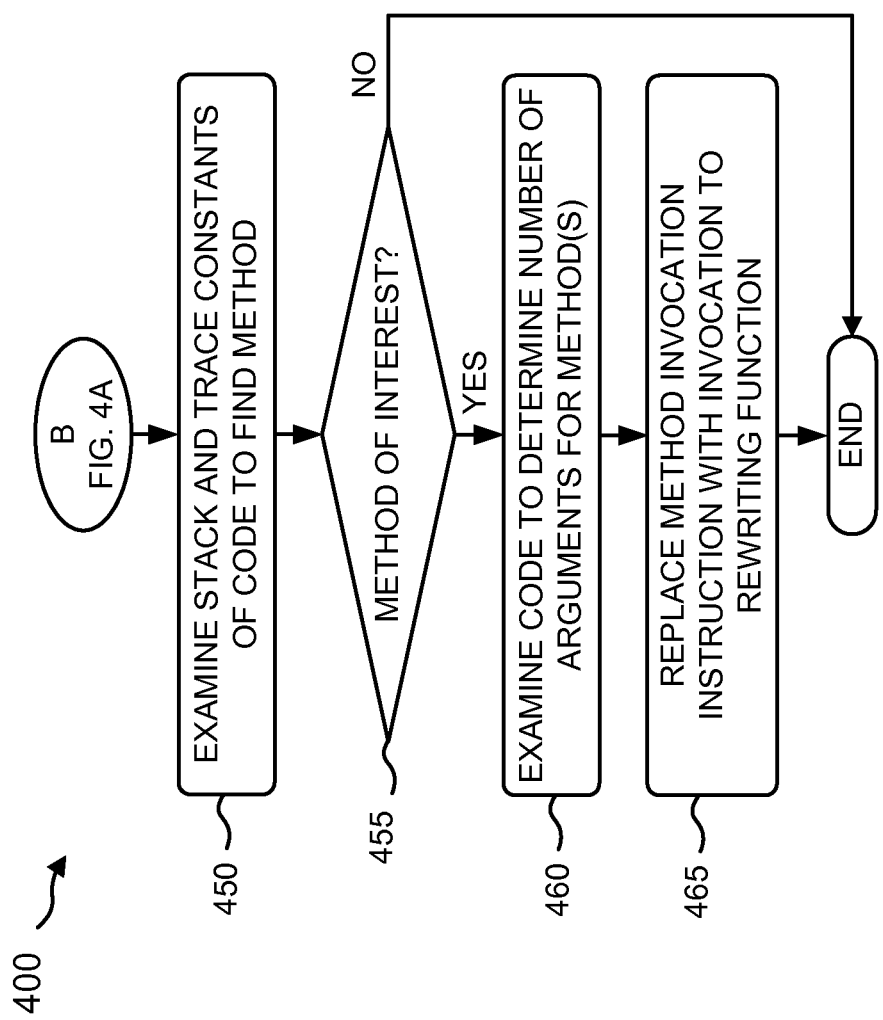

FIGS. 4A-4C provide a flowchart of an exemplary process for redirecting flash content to a secure intermediate network device according to an implementation consistent with principles of the invention. The process of FIGS. 4A-4C may begin when client 110 attempts to connect to network device 130, and/or when flash content is running on client 110. In one implementation, the process of FIGS. 4A-4C may be performed by one or more software and/or hardware components within a network device (e.g., network device 130). In another implementation, the process may be performed by one or more software and/or hardware components within another device or a group of devices separate from or including network device 130.

As shown in FIG. 4A, a process 400 may receive flash content (block 405). For example, in one implementation described above in connection with FIG. 1, client 110 may send request 160 for flash content, and the flash content may be redirected to network device 130 from server 120.

Process 400 may further disassemble the flash content and separate the flash content into sections (block 410). For example, in one implementation, the flash content may be disassembled and separated into content (e.g., media assets), and action code (e.g., sequences of executable code to manipulate the content and handle user interactivity). As further shown in FIG. 4A, process 400 may locate portion(s) of the flash content action code where network requests may occur (block 415). For example, in one implementation, the instruction set of the flash content action code may include two instructions that may generate network (e.g., HTTP) requests, e.g., "getURL" and "getURL2."

Process 400 may inject a client side library into the flash content action code (block 420). For example, in one implementation, network device 130 may provide client side library software 330 within the flash content action code. Client side library software 330 may review the flash content action code as the flash content is running on client 110.

Process 400 may determine if the flash content action code contains instructions for network requests (block 425). If the flash content action code contains instructions for network requests (block 425—YES), then the exemplary blocks of FIG. 4B may be performed.

If the flash content action code does not contain instructions for network requests (block 425—NO), then process 400 may determine if the flash content (e.g., ActionScript) contains functions related to network requests (block 430). For example, in one implementation, flash content functions provided in a stack may be dynamically invoked via an invocation action code instruction (e.g., "callMethod," which may also be known as "hex code 0x52").

As further shown in FIG. 4A, if the flash content contains functions related to network requests (block 430—YES), then the exemplary blocks of FIG. 4C may be performed. If the flash content does not contain such functions (block 430—NO), then process 400 may end.

As described above, the blocks shown in FIG. 4B may be performed if the flash content action code contains instructions for network requests (block 425—YES). As shown in FIG. 4B, process 400 may perform a flow analysis on the flash content action code and inspect a stack of the action code to locate a code parameter (block 435). For example, in one implementation, a flow analysis and/or stack inspection may be performed on the flash content action code to locate a code parameter that may generate a network request (e.g., "getURL").

As further shown in FIG. 4B, process 400 may rewrite the code parameter to point to an intermediate network device (block 440). For example, in one implementation, a string constant for the "getURL" code parameter may be rewritten to obtain a result string for redirection to an intermediate network device (e.g., network device 130). Process 400 may replace the portion of the flash content action code containing the code parameter with the rewritten code (block 445). For example, in one implementation, the result string for redirection to network device 130 may be used to replace the string constant for "getURL" in the flash content action code.

The blocks shown in FIG. 4C may be performed if the flash content contains functions related to network requests (block 430—YES). As shown in FIG. 4C, process 400 may examine the stack and the trace constants of the flash content action code to find a method or function (block 450). For example, in one implementation, the stack and the trace constants that have been placed on the stack may be examined to determine the name of a flash content ActionScript method or function.

If the method or function is not of interest (block 455—NO), then the process of FIG. 4C may end. If the method or function is of interest (block 455—YES), then process 400 may examine the flash content action code to determine the number of arguments for the method(s) or function(s) of interest (block 460). For example, in one implementation, any network related method or function names, e.g., "load," "send," "sendAndLoad," "loadVariables," "loadMovie," "connect," and/or "loadClip," may be deemed to be of interest. If the method or function name is of interest, then the flash content action code may be backtraced to determine the number of arguments for the method or function. For example, an instruction "push c:2, c:1, c:0" may indicate that a method or function may have only one argument, and may indicate that the method or function has an object as the argument.

As further shown in FIG. 4C, process 400 may replace the method or function invocation instruction in the flash content action code with an invocation to a rewriting function (block 465). For example, in one implementation, the method or function invocation instruction "loadMovie" may make a network request for movie content. In such a case, the argument(s) for the method or function "loadMovie" may be rewritten to redirect the URL for the movie content to an intermediate network device (e.g., network device 130), before invoking the method or function "loadMovie."

Rewriting Network Communications when Flash Content is Running

FIG. 5 is a flowchart of an exemplary process for redirecting flash objects to a secure intermediate network device according to an implementation consistent with principles of the invention. The process of FIG. 5 may begin when flash content is running on client 110. In one implementation, the process of FIG. 5 may be performed by one or more software and/or hardware components within a network device (e.g., network device 130). In another implementation, the process may be performed by one or more software and/or hardware components within another device or a group of devices separate from or including network device 130.

As shown in FIG. 5, a process 500 may determine if an object of the flash content action code may be of a certain class (block 510). For example, in one implementation, process 500 may determine if an object of the flash content action code may be of an object class that may include a network API of the same name. For example, a class (e.g., "MovieClip") may be of an object class that may include a method or function (e.g., "loadMovie") which may make a network request for movie content from a network server (e.g., server 120).

If an object of the flash content action code is of a certain class (block 510—YES), then process 500 may rewrite arguments of the flash content action code to redirect a URL to point to an intermediate network device (block 520). For example, in one implementation, the arguments for a method or function (e.g., "loadMovie") may be rewritten to redirect the URL for the movie content from a network server (e.g., server 120) to an intermediate network device (e.g., network device 130). If an object of the flash content action code is not of a certain class (block 510—NO), then process 500 may determine if an application class of the flash content action code implements a certain method or function (block 530). For example, in one implementation, some application classes in the flash content action code may implement the method or function "loadMovie," but may not make a network request for movie content from a private network. For example, the movie content may come from a source other than the private network, and thus may not need to be securely provided to the client.

If an application class of the flash content action code implements a certain method or function (block 530—YES), then process 500 may inject a code sequence that replaces a statement in the flash content action code (block 540). For example, in one implementation, a statement (e.g., trace("D-SReplaceMe")) may be replaced with a code sequence as shown in FIG. 12 and described more fully below.

Although FIG. 5 provides an exemplary implementation consistent with principles of the invention, other object classes of the flash content action code may include methods or functions that may make network requests. For example, the following object classes of the flash content action code may make network requests, and, accordingly may be redirected to an intermediate network device according to implementations consistent with principles of the invention: "XML.load," "LoadVars.load," "MovieClip.loadMovie," "MovieClip.loadVariables," "NetConnection.connect," "MovieClipLoader.loadClip," "XML.sendAndLoad," "LoadVars.send," and/or "LoadVars.sendAndLoad."

Examples

There are a number of ways to implement aspects of the invention. FIGS. 6A-12 are diagrams of a few exemplary implementations for redirecting flash content to a secure intermediate network device, consistent with principles of the invention. The intermediate network device may provide secure communications of the flash content between a client and a private network.

Exemplary Software Instructions for Modifying Flash Content

FIGS. 6A-6E are diagrams of exemplary portions of software instructions for redirecting flash content to a secure intermediate network device according to implementations consistent with principles of the invention. An exemplary portion 610 of a flash content ActionScript program may include the software instructions shown in FIG. 6A. To achieve URL redirection to an intermediate network device, portion 610 of the flash content ActionScript program may be rewritten to include instructions 620 shown in FIG. 6B. Instructions 620 of the flash content program may include a "RewriteAndLoad" instruction 630 (e.g., "RewriteAndLoad (movieName, "loadMovieNum", 1)") which may output a string 640 as shown in FIG. 6C.

As described above, implementations consistent with principles of the invention may modify flash content at the binary level. Accordingly, portion 610 of the flash content ActionScript program may be compiled into a flash content action code sequence 650 as shown in FIG. 6D. In order to redirect the flash content to an intermediate network device, flash content action code sequence 650 may be rewritten to a modified action code sequence 660 as shown in FIG. 6E. For example, in one implementation as described in connection with FIG. 4B, a "getURL2" instruction of flash content action code sequence 650 may be replaced with instructions 670 as shown in FIG. 6E (e.g., "push <flags>, 3, 'RewriteAndLoad'"; "callFunction"; and "pop"). Replacing the action code instruction "getURL2" with an invocation to an intermediate function, e.g., "RewriteAndLoad", may modify the flash content action code to redirect flash content to a secure intermediate network device. The intermediate function "RewriteAndLoad" may be injected into the same frame of flash content action code sequence 650 formerly occupied by action code instruction "getURL2."

Figure 7:
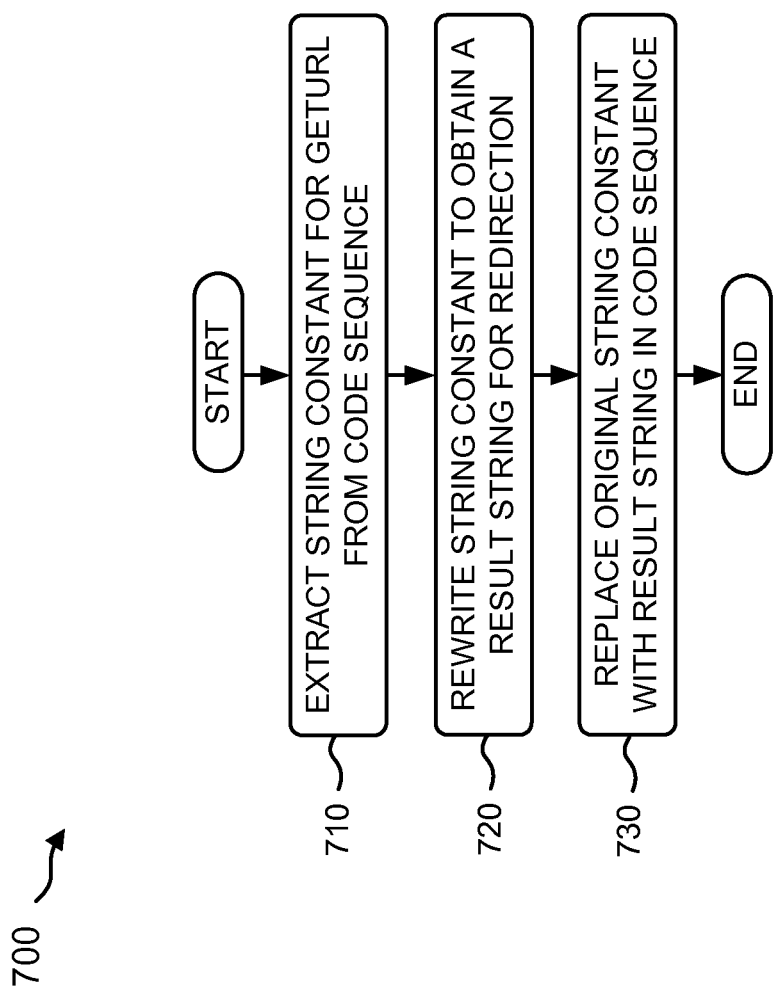
FIGS. 7 and 8 provide flowcharts of exemplary processes for redirecting flash content to a secure intermediate network device according to implementations consistent with principles of the invention.
Figure 8:
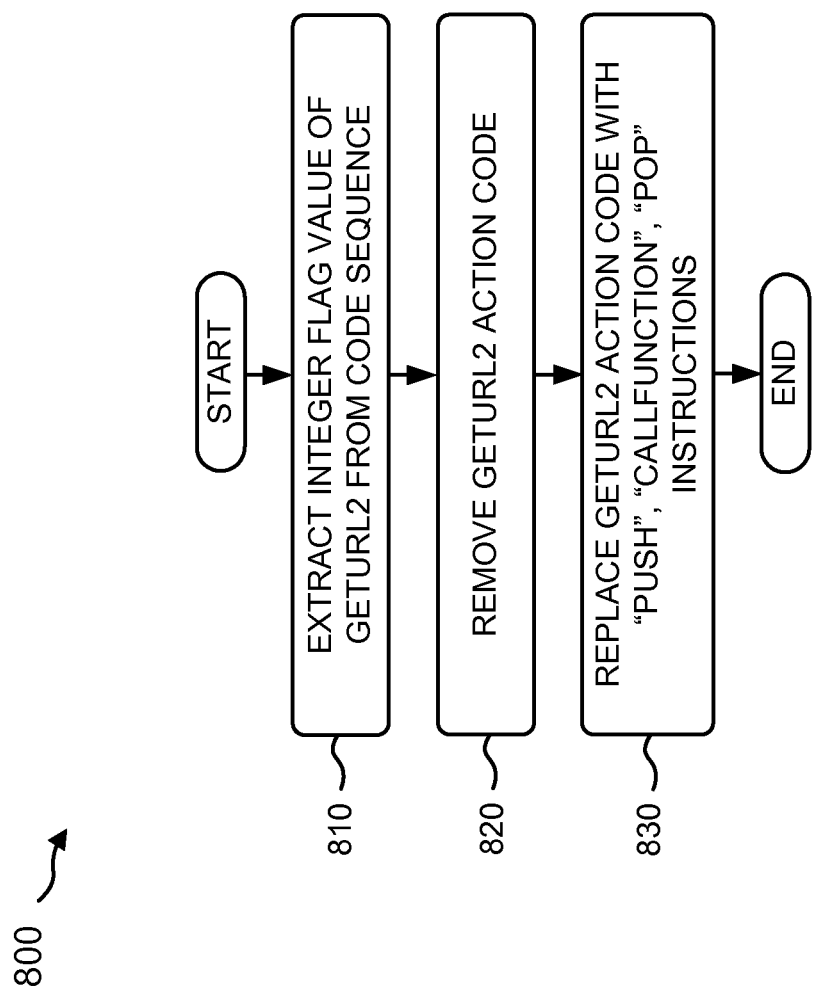

Exemplary Processes for Modifying Flash Content Action Code Generating Network Requests In flash content action code, there may be instructions (e.g., "getURL" and "getURL2") that may generate network requests. FIGS. 7 and 8 provide flowcharts of exemplary processes for modifying flash content action code containing the "getURL" and "getURL2" instructions according to implementations consistent with principles of the invention. The processes of FIGS. 7 and 8 may begin when client 110 attempts to connect to network device 130 and/or when flash content is running on client 110. In one implementation, the processes of FIGS. 7 and 8 may be performed by one or more software and/or hardware components within a network device (e.g., network device 130). In another implementation, the processes may be performed by one or more software and/or hardware components within another device or a group of devices separate from or including network device 130.

As shown in FIG. 7, a process 700 for modifying a "getURL" instruction may extract the string constant for the "getURL" instruction from the flash content action code sequence (block 710). For example, in one implementation described above in connection with FIG. 4B, a flow analysis and/or stack inspection may be performed on the flash content action code to locate a code parameter that may generate a network request (e.g., "getURL"). As further shown in FIG. 7, process 700 may rewrite the string constant to obtain a result string for redirection (block 720). For example, in one implementation described above in connection with FIG. 4B, a string constant for the "getURL" instruction may be rewritten to obtain a result string for redirection to an intermediate network device (e.g., network device 130).

Process 700 may replace the original string constant with the result string in the flash content action code sequence (block 730). For example, in one implementation described above in connection with FIG. 4B, the result string for redirection to network device 130 may be used to replace the string constant for the "getURL" instruction in the flash content action code.

As shown in FIG. 8, a process 800 for modifying a "getURL2" instruction of flash content action code may extract the integer flag value of the "getURL2" instruction from the flash content action code sequence (block 810). Process 800 may remove the "getURL" action code instruction (block 820), and may replace the "getURL" action code instruction with a "push" instruction, a "callfunction" instruction, and a "pop" instruction (block 830). For example, in one implementation, the "push" instruction may include three values: a flag value, an integer constant (e.g., "3"), and a string for the rewriting function (e.g., "RewriteAndLoad"). In another implementation, the "callfunction" instruction may invoke the rewriting function. In still another implementation, the "pop" function may pop off a function return value.

Exemplary "RewriteAndLoad" Software Instructions

FIG. 9 is a diagram of an exemplary portion of software instructions for redirecting flash content to a secure intermediate network device according to an implementation consistent with principles of the invention. Flash content ActionScript program functions, e.g., "loadMovie," "loadMovieNum," "loadVariables," and/or "loadVariablesNum," may be compiled into the "getURL2" action code instruction (as described above in connection with FIG. 8) with differentiating flags. A replacement ActionScript program function (e.g., "RewriteAndLoad") may be given a flag value so that it may, after rewriting the URL string, invoke the original flash content ActionScript program function (e.g., "loadMovie"). For example, a portion 910 of the "RewriteAndLoad" replacement function may include the instructions shown in FIG. 9.

Exemplary Software Instructions for Rewriting Dynamic Invocation of Flash Content Methods FIGS. 10A-10C are diagrams of exemplary portions of software instructions for redirecting flash content to a secure intermediate network device according to an implementation consistent with principles of the invention. As described above, for dynamic invocation of a flash content (e.g., ActionScript program) method or function in a binary action code sequence, one implementation of the invention may examine the stack and/or trace constants to determine the name of the method or function. If the method or function is of interest, then inspection may be performed on the flash content action code to determine the number of arguments for the identified method or function. The action code instruction invoking the method or function may be replaced with an action code instruction invoking a rewriting function so that the original method or function may be evaluated (e.g., by an intermediate network device), and parameters adjusted, before actual invocation of the original method or function.

For example, FIG. 10A provides an exemplary portion 1010 of a flash content ActionScript program, and FIG. 10B provides a flash content action code sequence 1020 that may be compiled based on exemplary portion 1010 of the flash content ActionScript program. As described above in connection with FIG. 4C, process 400 may examine the stack and the trace constants of the flash content code to find a method or function. For example, in one implementation, action code sequence 1020 may be examined to determine if there are any "callMethod" instructions in action code sequence 1020. Since there is a "callMethod" instruction in action code sequence 1020, as shown in FIG. 10B, action code sequence 1020 may be backtraced to determine the name of a method or function invoked by the "callMethod" instruction. In the exemplary instructions of FIG. 10B, instruction "push c:3" of action code sequence 1020 may indicate that the name of the network related method or function is "load." Other network related method or function names may include, for example, "send," "sendAndLoad," "loadVariables," "loadMovie," "connect," and/or "loadClip."

If the method or function name may be of interest (e.g., network related), then flash content action code sequence 1020 may be backtraced to determine the number of arguments for the method or function, as described above in connection with FIG. 4C (block 460). For example, an instruction "push c:2, c:1, c:0" of action code sequence 1020 may indicate that a method or function (e.g., "load") may have only one argument, and may have an object as the argument. The instruction of action code sequence 1020 invoking the method or function may be replaced with a new action code sequence redirecting the method or function invocation to a rewriting function so that the original method or function may be evaluated (e.g., by an intermediate network device), and parameters adjusted, before actual invocation of the original method or function. For example, in one implementation described above in connection with FIG. 4C (block 465), action code sequence 1020 of FIG. 10B may be replaced with an action code sequence 1030 shown in FIG. 10C. In such a case, the argument(s) for the method or function "load" may be rewritten to redirect the URL to an intermediate network device (e.g., network device 130) before invoking the method or function "load."

Action code sequence 1030 may include a flash content ActionScript function "RewriteMethodInvocation1," which may be injected into the same frame of the action code formerly occupied by the "callMethod" instruction to implement an inspection of parameters. The "RewriteMethodInvocation1" function may include a flash content ActionScript program 1110 as shown in FIG. 11. Flash content program 1110 may determine if an object of the flash content action code may be of an object class that may include a network API of the same name, as described above in connection with FIG. 5 (block 510). For example, a class (e.g., "MovieClip") may be of an object class that may include a method or function (e.g., "loadMovie") which may make a network request for movie content, as shown in FIG. 11.

If an object of the flash content action code is of a certain class, then flash content program 1110 may rewrite arguments of the flash content action code to redirect a URL to point to an intermediate network device, as described above in connection with FIG. 5 (block 520). For example, in one implementation, the arguments for the method or function "loadMovie" may be rewritten by flash content program 1110 to redirect the URL for the movie content from a network server (e.g., server 120) to an intermediate network device (e.g., network device 130). If an object of the flash content action code is not of a certain class, then flash content program 1110 may determine if an application class of the flash content action code implements a certain method or function, as described above in connection with FIG. 5 (block 530). For example, in one implementation, some application classes in the flash content action code may also implement the method or function "loadMovie," but may not invoke a network request.

If an application class of the flash content action code implements a method or function not invoking a network request, then the flash content action code may not be modified. Rather, flash content program 1110 may inject an action code sequence that replaces a statement in the flash content action code, as described above in connection with FIG. 5 (block 540). For example, in one implementation, a "trace ("DSReplaceMe")" statement may be replaced with an action code sequence 1210 shown in FIG. 12. In action code sequence 1210, "<arg>" may be the actual argument and "<methodName>" may be the method or function name.

Although a "RewriteMethodInvocation1" function is shown in FIG. 11, in one implementation consistent with principles of the invention, additional flash content program functions similar to the "RewriteMethodInvocation1" function may be provided to redirect method or function network requests, which may include one to three arguments, to an intermediate network device (e.g. network device 130). For example, a class (e.g., "LoadVars") may have a method or function (e.g., "sendAndLoad") that may have three arguments.

Conclusion

Implementations consistent with principles of the invention may relate to systems and methods for intercepting and intermediating network requests of flash content for secure delivery over a network. The systems and methods may operate directly on the compiled binary flash content action code, instead of modifying and recompiling the original source code of the flash content. When the flash content is executed inside a flash player (e.g., on client 110), all network communications may be redirected through an intermediate network device (e.g., network device 130). For example, in one implementation, network traffic of flash content between a flash player (e.g., on client 110) and a network server (e.g., server 120) may be secured via a SSL protocol provided on network device 130.

The systems and methods consistent with principles of the invention provide many advantages. For example, the systems and methods may be applicable to any packaged flash content and at the time of a network request and/or response processing, without the need to modify the flash content at a source level or rebuild the packaged flash content. The systems and methods may thus be transparent to and independent of the owners of the flash content. The systems and methods may provide the further advantage of being applied at application layer network communication constructs, without the need for transmission control protocol (TCP) traffic inspection and/or flow manipulation, or other lower network layer operations. The systems and methods may provide the still further advantage of being clientless, i.e., no additional components and/or software need to be installed on the client.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 4A-4C, 5, 7, and 8, the order of the acts may differ in other implementations consistent with principles of the invention. Also, non-dependent acts may be performed in parallel.

Although exemplary implementations consistent with principles of the invention focused on redirecting network communication of flash content to a secure intermediate network device, the flash content action code may be rewritten for any non-networking purpose in a manner similar to the exemplary implementations of the invention. Furthermore, the exemplary implementations consistent with principles of the invention may be applied to a variety of content similar to flash content, e.g., JavaScript, ActiveX, etc.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device and via a network, executable content associated with a network request;
   disassembling, by the network device, the executable content into action code;
   locating, by the network device, portions of the action code capable of making the network request,
      the locating the portions of the action code including:
         performing a flow analysis on the action code to produce a first result,
         inspecting a stack of the action code to produce a second result,
         locating, using the first result and the second result, at least one code parameter related to making the network request, and
         locating the portions of the action code based on the at least one code parameter,
            the portions of the action code including the at least one code parameter;
   rewriting, by the network device, the portions of the action code to form rewritten action code,
      the rewritten action code redirecting a network communication, associated with the executable content, to a particular network device, and
      the rewriting the portions of the action code including:
         rewriting, in the portions of the action code, the at least one code parameter; and
   providing, by the network device and via the network, the rewritten portion of the action code to a client device associated with the network request.

2. The method of claim 1, the rewriting the portions of the action code further including:
   providing, for installation on the client device, an application that rewrites the portions of the action code.

3. The method of claim 1, the rewriting the portions of the action code further including:
   identifying an object requested through the network communication;
   determining that the object is associated with a particular class; and
   rewriting, based on determining that the object is associated with the particular class, arguments, included in the action code, that are associated with the particular class.

4. The method of claim 1, the rewriting the portions of the action code further including:
   identifying an action associated with the network communication;
   identifying statements in the action code associated with the action; and
   replacing the identified statements with replacement statements that cause the action to be implemented via the particular network device.

5. The method of claim 4, the identifying the action further comprising:
   examining one or more stack constants of the action code and one or more trace constants of the action code; and
   identifying the action based on examining the one or more stack constants and the one or more trace constants.

6. The method of claim 5, the replacing the identified statements with the replacement statement further comprising:
   identifying, based on examining the one or more stack constants and one or more trace constants, arguments in the action code associated with the action; and
   rewriting the identified arguments to include a network identifier associated with the particular network device,
      the rewritten arguments causing the network request to be directed, based on the network identifier, to the particular network device.

7. The method of claim 1, the action code being associated with one or more of:
   flash content,
   JavaScript, or
   ActiveX code.

8. A device comprising:
   one or more processors to:
      receive, via a network, executable content associated with a network request from a client device to a computer device external to the network;
      disassemble the executable content into action code;
      locate portions of the action code capable of making the network request,
         the one or more processors, when locating of the portions of the action code, being further to:
            perform a flow analysis on the action code to produce a first result, inspect a stack associated with the action code to produce a second result,
locate, using the first result and the second result, a code parameter related to making the network request associated with the executable content, and
locate the portions of the action code based on the code parameter;
rewrite the portions of the action code to redirect a network communication, associated with the executable content, to a particular network device associated with the particular network,
the one or more processors, when rewriting the portions of the action code, being further to:
rewrite the code parameter to redirect the network communication, associated with the executable content, to the particular network device; and
provide, via the network, modified action code, that includes the rewritten portions of the action code, to the client device associated with the network request.

9. The device of claim 8, the one or more processors, when rewriting the portions of the action code, being further to:
provide, to the client device, an application to be installed on the client device, the application rewriting the portions of the action code.

10. The device of claim 8, the one or more processors, when rewriting the portions of the action code, being further to:
identify an object requested through the network communication;
determine that the object is associated with a particular class; and
rewrite, based on determining that the object is associated with the particular class, arguments, included in the action code, that are associated with the particular class.

11. The device of claim 8, the one or more processors, when rewriting the portions of the action code, being further to:
identify an action associated with the network communication;
identify, statements in the action code associated with the action; and
replace the identified statements with replacement code that causes the action to be implemented via the particular network device.

12. The device of claim 11, the one or more processors, when identifying the action, being further to:
examine one or more stack constants of the action code and one or more trace constants of the action code; and
identify the action based on examining the one or more stack constants and the one or more trace constants.

13. The device of claim 11, the one or more processors, when replacing the identified statements with the replacement code, being further to:
identify, based on one or more stack constants and one or more trace constants, arguments, in the action code, associated with the action; and
rewrite the identified arguments to include a network identifier associated with the particular network device,
the rewritten arguments causing the network request to be directed, based on the network identifier, to the particular network device.

14. The device of claim 8, the action code being associated with one or more of:
flash content,
JavaScript, or
ActiveX code.

15. A non-transitory computer-readable medium to store instructions, the instructions comprising:
one or more instructions which, when executed by a processor, cause the processor to receive executable content associated with a network request;
one or more instructions which, when executed by the processor, cause the processor to disassemble the executable content into action code;
one or more instructions which, when executed by the processor, cause the processor to locate portions of the action code capable of making the network request,
the one or more instructions to locate the portions of the action code further including:
one or more instructions which, when executed by the processor, cause the processor to perform a flow analysis of the action code and to inspect a stack of the action code,
one or more instructions which, when executed by the processor, cause the processor to locate, based on performing the flow analysis of the action code and inspecting the stack of the action code, a code parameter related to making the network request associated with the executable content, and
one or more instructions which, when executed by the processor, cause the processor to locate the portions of the action code based on the code parameter;
one or more instructions which, when executed by the processor, cause the processor to rewrite the portions of the action code, capable of making the network request, to redirect a network communication, associated with the executable content, to a particular network device,
the one or instructions to rewrite the portions of the action code further including:
one or more instructions which, when executed by the processor, cause the processor to rewrite the code parameter to redirect the network communication, associated with the executable content, to the particular network device; and
one or more instructions which, when executed by the processor, cause the processor to provide the rewritten portions of the action code to a client device.

16. The non-transitory computer-readable medium of claim 15, the one or more instructions to rewrite the portions of the action code further including:
one or more instructions to provide, to the client device, an application,
the application, when installed on the client device, rewriting the portions of the action code.

17. The non-transitory computer-readable medium of claim 15, the one or more instructions to rewrite the portions of the action code further including:
one or more instructions to identify an object requested through the network communication;
one or more instructions to determine that the object is associated with a particular class; and
one or more instructions to rewrite, in the portions of the action code and based on determining that the object is associated with the particular class, arguments associated with the particular class.

18. The non-transitory computer-readable medium of claim 15, the one or more instructions to rewrite the portions of the action code further including:
one or more instructions to identify an action associated with the network communication;
one or more instructions to identify statements in the action code associated with the action; and one or more instructions to replace the identified statements with replacement code that causes the action to be implemented via the particular network device.

19. The non-transitory computer-readable medium of claim 18, the one or more instructions to identify the action further including:
one or more instructions to examine one or more stack constants of the action code and one or more trace constants of the action code; and
one or more instructions to identify the action based on examining the one or more stack constants and the one or more trace constants.

20. The non-transitory computer-readable medium of claim 19, the one or more instructions to replace the identified statements with the replacement code further including:
one or more instructions to identify, based on the one or more stack constants and the one or more trace constants, arguments, in the action code, associated with the action; and
one or more instructions to rewrite the identified arguments to include a network identifier associated with the particular network device,
the rewritten arguments causing the network request to be directed, based on the network identifier, to the particular network device.

* * * * *

UNITED STATES PATENT AND TRADEMARK OFFICE
CERTIFICATE OF CORRECTION

PATENT NO. : 8,484,364 B2
APPLICATION NO. : 13/460618
DATED : July 9, 2013
INVENTOR(S) : Zeqing Xia Page 1 of 1

It is certified that error appears in the above-identified patent and that said Letters Patent is hereby corrected as shown below:

In the Claims

Please correct claim 1 as follows:

Column 16, line 10, should read: "rewritten action code to a client device"

Signed and Sealed this
Twenty-fourth Day of September, 2013

Teresa Stanek Rea
*Deputy Director of the United States Patent and Trademark Office*